US005550710A

United States Patent [19]
Rahamim et al.

[11] Patent Number: 5,550,710
[45] Date of Patent: Aug. 27, 1996

[54] PACKAGING AND COOLING STRUCTURE FOR THE PERSONAL PROCESSOR MODULE

[75] Inventors: Uriel Rahamim, Palo Alto; Randy Minobe, San Jose; Ahmad A. Chahrour, Santa Clara; Raanan Ben-Zur, Campbell, all of Calif.

[73] Assignee: Hitachi Computer Products (America), Inc., Santa Clara, Calif.

[21] Appl. No.: 303,318

[22] Filed: Sep. 9, 1994

[51] Int. Cl.[6] .............. H05K 7/14; G06F 13/00
[52] U.S. Cl. ............... 361/687; 361/686; 361/699; 361/700
[58] Field of Search ............... 361/683, 686, 361/687, 699, 707–709

[56] References Cited

U.S. PATENT DOCUMENTS

| | | | |
|---|---|---|---|
| 4,137,563 | 1/1979 | Tsunada | 395/750 X |
| 5,187,645 | 2/1993 | Spalding et al. | 361/686 |
| 5,264,992 | 11/1993 | Hogdahl et al. | 367/686 X |
| 5,278,730 | 1/1994 | Kikinis | 361/686 |

*Primary Examiner*—Leo P. Picard
*Assistant Examiner*—Jayprakash N. Gandhi
*Attorney, Agent, or Firm*—Flehr, Hohbach, Test Albritton & Herbert

[57] ABSTRACT

A housing and cooling structure for a personal processor module (PPM) is provided which includes a case which is sealed and will fit within both a desktop sized docking station and a smaller notebook sized docking station. Within the case, the components which make up the PPM are located in such a way as to minimize the size of the printed circuit boards. In addition, a cooling mechanism is provided which cools all of the components within the case. Also, the PPM has structure for converting 3.3 volt signals into 5 volt signals and for permitting easy upgrades.

36 Claims, 13 Drawing Sheets

PACKAGING AND COOLING STRUCTURE FOR THE PERSONAL PROCESSOR MODULE

RELATED APPLICATIONS

Copending U.S. application Ser. No. 08/027,188 filed Mar. 5, 1993, now U.S. Pat. No. 5,463,742 to Kobayashi is included herein by reference.

FIELD OF THE INVENTION

The invention relates generally to the field of transportable computers and more particularly to a housing for a transportable computer which allows the transportable computer to operate at a moderate temperature and allows the computer to be easily upgradeable for future improvement. In addition, the housing has been designed so that the transportable computer can be docked with a docking station designed as a notebook computer which has very strict size and cooling requirements.

BACKGROUND OF THE INVENTION

Computer users who work at several locations have long sought a system that they could use wherever it is convenient. Such multilocational computer users may work at the office and at home or may move from office to office to supervise work for several groups in different locations. In addition, they may move from building to building, for example, from laboratory to library to computer room; or be telecommuters who work in both the main office and at a satellite office or at home. Up to now, such users have to either buy multiple systems, or carry a single system from location to location. Where it is not possible because of cost and administration time to pursue the above alternatives, some multilocational users had to work at different computers and terminals, frequently dealing with different interfaces, processors, different sets of commands, and without a ready availability of the applications and files which facilitate their work.

Rather than purchasing several personal computers and/or work stations and accompanying software for each location, it is important to find a cheaper solution. Further, rather than administering several personal computers or work stations for software upgrades or configuration changes at each location where the users work, it is desirable to find a way to save that time and expense as well.

It has also long been a desirable objective to increase security for the valuable parts of the computer system, such as the processing unit, hard disc, software and data from thieves or persons bent on interference with the operation of the company. It would be desirable, when the computer is not in use, to remove these valuable parts from the computer system in the office and keep them in a secure place.

An effort has been made to address the problems outlined above by providing portable desktop and notebook computers. However, even notebook computers are fairly large and bulky since they contain the keyboard, display and power supply. People who frequently use a computer in a fixed location and do not use it while traveling, for example, in an airplane or the like, do not want to carry such a big module while moving from location to location. Further, they are usually frustrated by the reduced size of the keyboard and limited clarity of the screen.

A number of forces have driven the need for the present invention. Working in several locations is increasing due to the need to support more flexible working and management styles which increase productivity and improve the work environment. In addition, technological and management innovations such as networking, work group application software and the like make it easier for valued employees to work at a number of locations.

Sometimes, different machines may be needed for different specific tasks performed by the same engineer. The ability to use different machines, for example, a desktop for one purpose, a portable for another purpose, is desirable because it is effective in increasing user productivity.

In addition, the necessity of frequently upgrading the processor and software is increasing and innovations in processor performance is accelerating. Also, the operating systems and application software innovations which make use of the high performance processors available, increase the productivity of the users. Thus, when a user is going to work at several locations, minimizing the cost of these upgrades and minimizing the time needed for the upgrade can be a critical consideration.

The prior art attempts to answer all of these problems have not succeeded. The present personal processor module (PPM), as described in U.S. application Ser. No. 08/027,188, incorporated herein by reference, solves the above-mentioned problems. However, several other problems exist which were not addressed initially.

First, any highly transportable computer module should be packaged so that it fits within either a notebook or desktop docking station so that the module is truly universal. The module should also be sealed against dust and water. In a preferred configuration, the module should also permit the co-existence of 3.3 volt and 5 volt logic devices, be easily upgradeable, and provide in excess of 200 megabytes of non-volatile storage. The module should be cooled such that a desktop docking station with a fan can meet governmental requirements and a notebook docking station without a fan can also meet governmental requirements. Both the module and the docking station to which it attaches may be configurable to multiple docking stations and multiple modules, respectively. The module may be compatible with IBM's basic input/output system (BIOS) as well as Windows NT, DOS, OS2 and Solarius and provide performance equivalent to high-end desktop computers.

OBJECT AND SUMMARY OF THE INVENTION

Therefore, it is an object of the present invention to provide a transportable PPM which will fit into a docking station in either a desktop or a notebook computer and is sealed against dust and water contamination.

It is another object of the present invention to provide a PPM which has a case which has sufficient cooling mechanisms so that the PPM can be operated safely in either a desktop or notebook docking station.

It is another object of the present invention to provide a PPM which has structures within the case which allow for the easy upgrade of both the processor and other components within the PPM system. A further object of the invention is to permit the co-existence of 3.3 volt and 5 volt logic devices within a PPM.

It is another object of the present invention to provide a PPM which can run multiple operating systems, is compatible with IBM BIOS and has the performance of a high end desktop system.

These and other objectives can be achieved by the packaging and cooling structure of the present invention which has a case made of a sturdy material which is also watertight. In addition, the case has a cooling mechanism which keeps the components within the case and the case itself at reasonable temperatures. Also, the case is constructed such that the PPM fits within a notebook or a desktop docking station. Also, the PPM is configured to permit easy upgrades of the microprocessor as new designs are developed.

BRIEF DESCRIPTION OF THE DRAWINGS

The advantages and technical features of the present invention will become more readily apparent when the following disclosure and drawings are viewed together, wherein:

FIG. 1b is a side view of the case shown in FIG. 1a;

FIG. 1c is the front view of the case shown in FIG. 1a;

FIG. 2 is a layout schematic of the component side of the printed circuit board contained within the case shown in FIG. 1a;

FIG. 3 is a layout schematic of the solder side of the printed circuit board contained within the case shown in FIG. 1a;

FIG. 5b is a side view of the case shown in FIG. 5a;

FIG. 5c is the front view of the case shown in FIG. 5a;

FIG. 6 is a layout schematic of the component side of the upper printed circuit board contained within the case shown in FIG. 5a;

FIG. 7 is a layout schematic of the solder side of the upper printed circuit board contained within the case shown in FIG. 5a;

FIG. 8 is a layout schematic of the component side of a lower printed circuit board contained within the case shown/ in FIG. 5a;

FIG. 9 is a layout schematic of the solder side of the lower printed circuit board contained within the case shown in FIG. 5a;

FIG. 10b is a side view of the case shown in FIG. 10a;

FIG. 10c is the front view of the case shown in FIG. 10a;

FIG. 11 is a layout schematic of the component side of the printed circuit board contained within the case shown in FIG. 10a;

FIG. 12 is a layout schematic of the solder side of the printed circuit board contained within the case shown in FIG. 10a;

FIG. 16b is a side view of the case shown in FIG. 16a;

FIG. 16c is the front view of the case shown in FIG. 16a;

FIG. 17 is a layout schematic of the component side of the upper printed circuit board contained within the case shown in FIG. 16a;

FIG. 18 is a layout schematic of the solder side of the upper printed circuit board contained within the case shown in FIG. 16a;

FIG. 19 is a layout schematic of the component side of a lower printed circuit board contained within the case shown in FIG. 16a;

FIG. 20 is a layout schematic of the solder side of the lower printed circuit board contained within the case shown in FIG. 16a.

DETAILED DESCRIPTION OF THE INVENTION

Figure 1A:
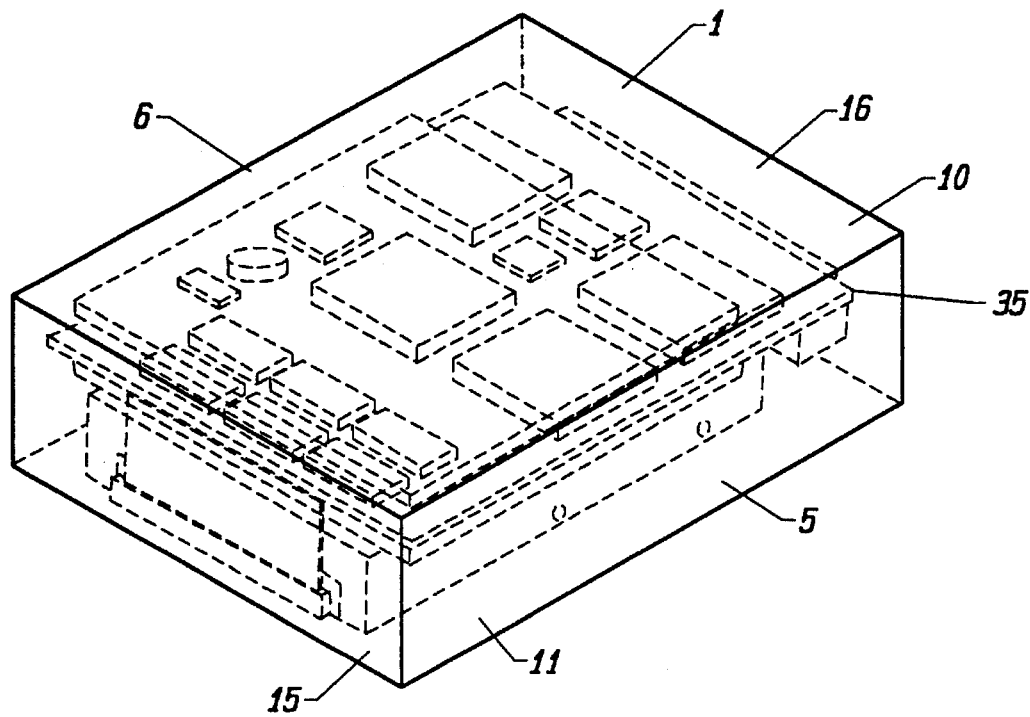
FIG. 1a is an isometric view of a first embodiment of a case and the internal components of a PPM which uses a P24C processor and a single printed circuit board.

Features which apply to all of the embodiments as a whole will be described now. In all of the embodiments of PPMs shown, a case is used to house and seal the components of the PPM from dust and water contamination. All of the cases shown in the embodiments are sealed. The height of 1" for the case of the second and fourth embodiments allow those cases and the PPMs they enclose to be docked inside a notebook computer as well as a desktop computer. Within the case is a hard disc drive, which may be preferably a 2.5" drive, or a 1.8" drive or a 1.3" drive, and is located underneath or beside the printed circuit board within the case. The cases are preferably constructed of aluminum which has good heat transfer characteristics, but may also be made of magnesium. The case also has heat management devices and appropriate power management software to cool the PPM.

A main memory 100 and a cache memory 95, shown in all of the embodiments, have several configurations. The main memory may be 8 megabytes (Mb) in size, 16 Mb, 32 Mb or 64 Mb in size using conventional memory chips. The cache memory 95 may be 128 kilobytes (Kb) or 256 Kb in size. In the embodiments using a P24C processor, the main memory 100 is preferably either 8 or 16 Mb in size and the cache is preferably 128 Kb in size. In the embodiments using a P54C processor, the main memory 100 is preferably 16 or 32 Mb in size and the cache is preferably 256 Kb in size.

Finally, all of the embodiments of the PPM shown are preferably compatible with the IBM basic input/output system (BIOS) and are compatible with the Windows NT, DOS, OS2 and Solarius operating systems.

Figure 1B:
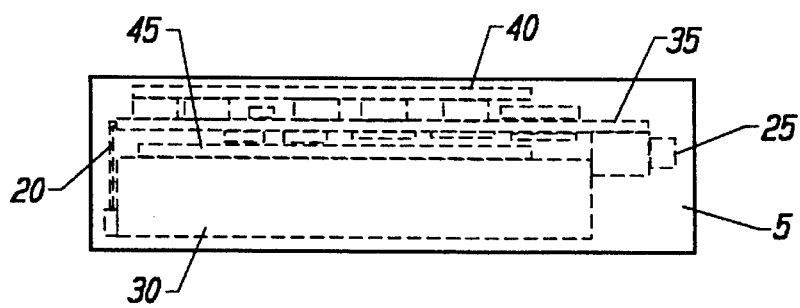
Figure 1C:
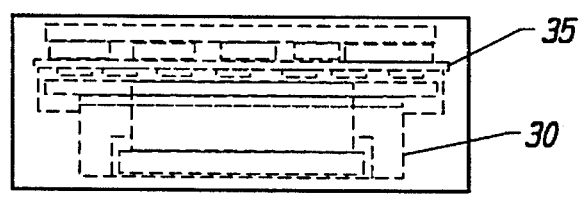

With reference to FIGS. 1a, 1b and 1c, a case 1 which will house one embodiment of the PPM will be described. In this embodiment of the present invention, a P24C processor made by Intel Corporation will be incorporated within the case with a 2.5" hard disc drive and a single printed circuit board. A pair of side walls 5,6 of the case are preferably made of aluminum. The side walls 5,6 have dimensions of 1.48 inches (37.54 mm) high by 5.02 inches (127.63 mm)

long. A top wall 10 and a bottom wall 11 of the case are also preferably made of aluminum and have dimensions of 3.84 inches (97.51 mm) wide and 5.02 inches (127.63 mm) long. A front wall 15 and a back wall 16 are also preferably made of aluminum and have dimensions of 1.48 inches (37.54 mm) high by 3.84 inches (97.51 mm) wide. All of these walls, when attached together, form the case 1 which houses the processor, the hard disc drive and the printed circuit board. Preferably, the case 1 is sealed so that no external contaminants can enter the housing.

FIG. 1b shows a side view of the case 1 for the PPM. As is shown, a hard disc drive 30 is located adjacent the bottom wall 11. The hard disc drive 30 is preferably a 200 Mb 2.5" disc drive. A flex-circuit 20 connects the hard disc drive 30 to a printed circuit board 35 which is located directly above the hard disc drive. In between the hard disc drive 30 and the printed circuit board 35 is a liquid heatsink 45 which helps to transfer heat away from the disc drive and the printed circuit board. The operation of the liquid heatsink 45 will be described more completely below. The printed circuit board 35 has a number of components attached to it which will be described with reference to FIGS. 2 and 3 below. The printed circuit board 35 also has a 200 pin docking connector 25 connected to it.

The docking connector 25 must be highly reliable and is preferably an AMP 200 position connector which can handle in excess of 5000 connections. In addition, since the docking connector 25 has two hundred pins, pins are available for both 5 volt supply and 3.3 volt supply which allows compatibility with both 5 volt components and 3.3 volt future components. Also, since the docking connector 25 is universal for all PPMs and docking stations, a PPM which is used for a notebook docking station can also be used with a desktop docking station. Finally, since the docking connector 25 can handle 64 bit and 32 bit signals, the PPM can be plugged into both 32 bit systems (probably notebook systems) and 64 bit systems (probably desktop computers).

The docking connector 25 is located adjacent the back wall 16 of the case since the connector must electrically connect the PPM to the docking station when the PPM is docked. Another liquid heatsink 40 is located directly above the printed circuit board 35. This liquid heatsink also helps cool the components located on the printed circuit board and transfer any heat generated to the case 1. The operation of the liquid heatsink 40 will also be described more fully below. FIG. 1c shows a front view of the case 1 and the vertical alignment and stacking of the hard disc drive, printed circuit board and heatsinks.

Figure 2:
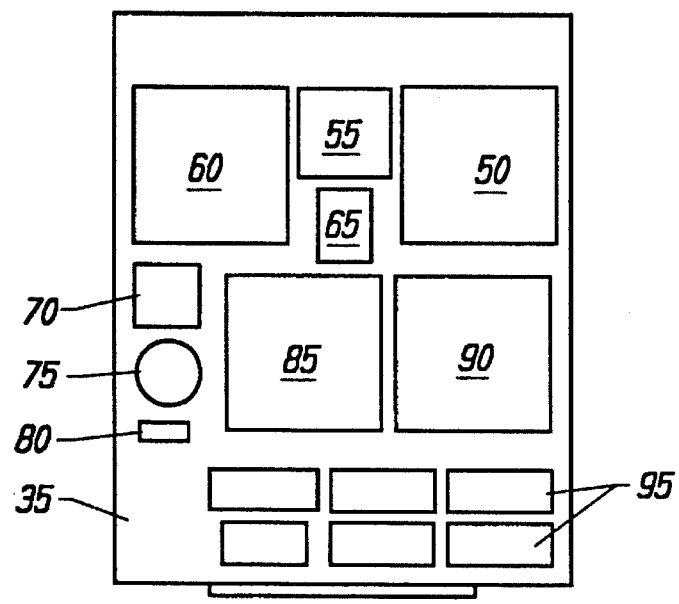
Figure 3:
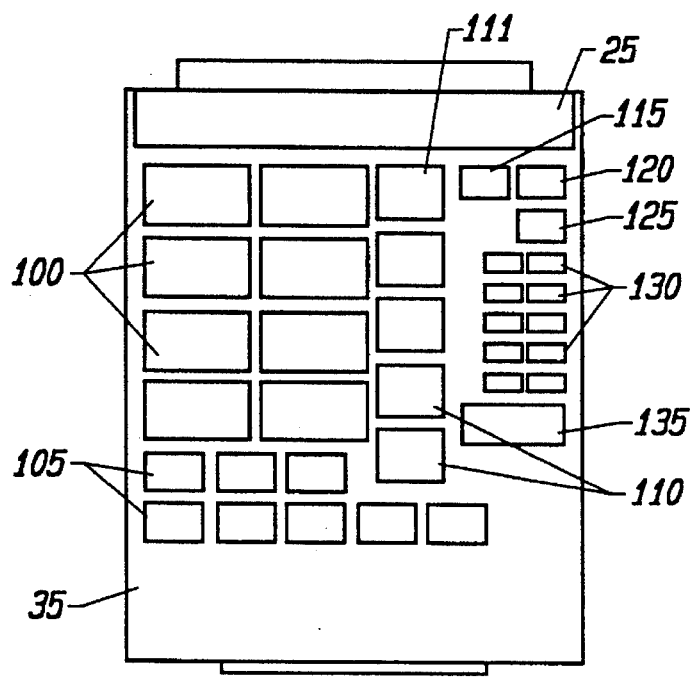
Figure 4:
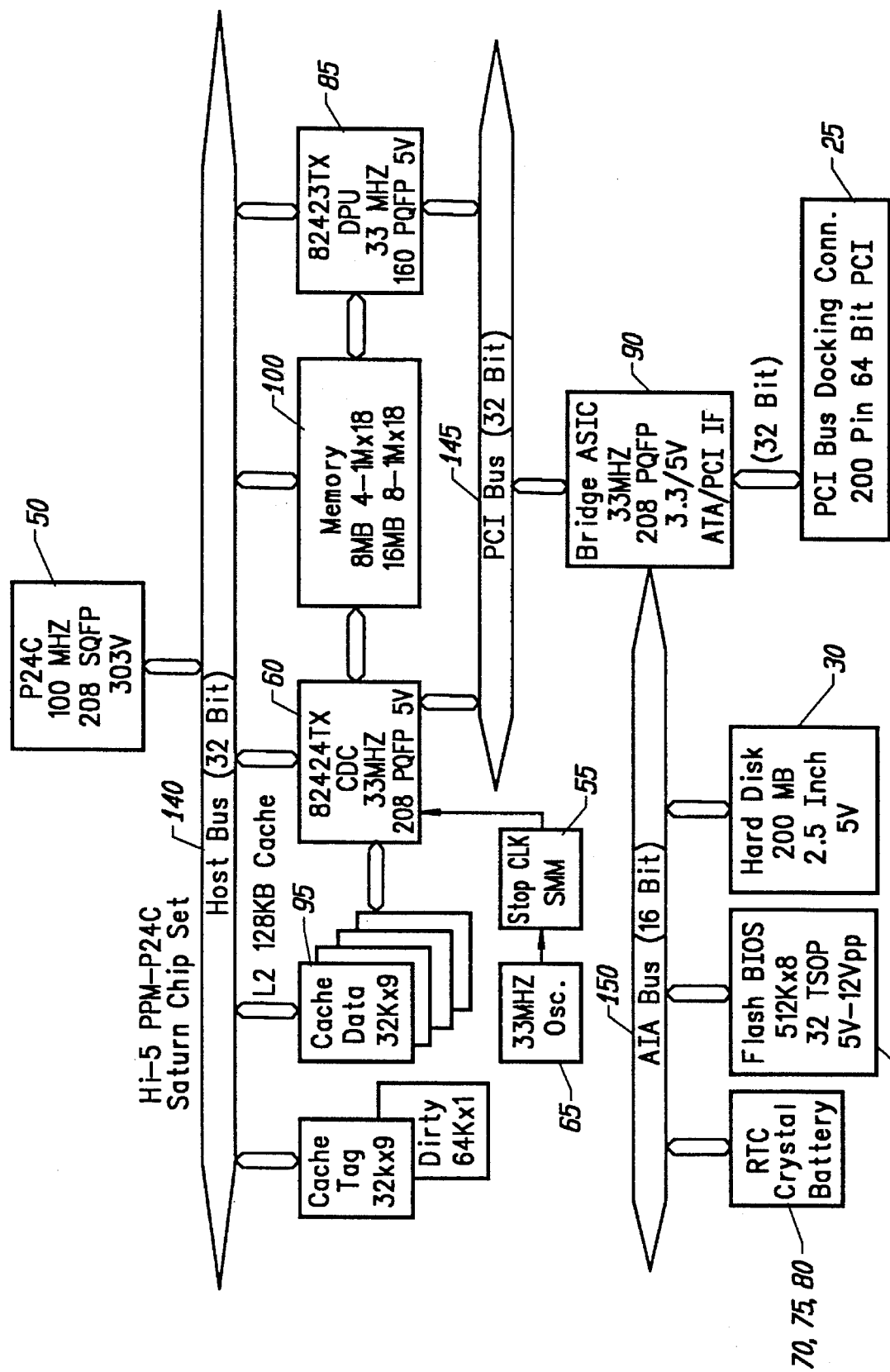
FIG. 4 is a block diagram of the electrical connections between the various components of the first and second embodiments which use the P24C processor.

FIGS. 2 and 3 show the physical layouts of the components on the printed circuit board 35 shown in FIGS. 1a, 1b and 1c. FIG. 4 shows the electrical connections between the various components shown in FIGS. 2 and 3. The components on the printed circuit board will be described with reference to FIGS. 2, 3 and 4. In this particular embodiment, only a single printed circuit board is utilized. The printed circuit board is a typical printed circuit board which is 4.49 inches (114 mm) long and 3.54 inches (90 mm) wide. The layout of the components and the size of the printed circuit board are such that the PPM within its case can easily fit into a notebook computer docking station.

A P24C processor 50 made by Intel Corporation is the preferred microprocessor in this embodiment of the PPM. The P24C is 40486 processor running at 100 Mhz using 3.3 volt technology which reduces the power consumption of the processor. The P24C processor is located on the component side of the printed circuit board (PCB), as shown in FIG. 2, near the northeast corner of the PCB. As shown in FIG. 4, the processor 50 is electrically connected to a CPU host bus 140 which is 32 bits wide. The host bus 140 also provides electrical connections between the processor 50 and a memory 100 and a cache memory 95.

The cache memory 95 which is also electrically connected to the host bus 140 and operates at 3.3 volts, is located on the component side of the printed circuit board, as shown in FIG. 2. The cache memory 95 is shown as six Static Random Access Memory (SRAM) chips which make up 128K of cache data, 32K of dirty cache and 32K of cache tags. SRAMs are used for the cache memory 95 since the SRAMs are quick and can handle the speed requirements. The cache tags store the addresses of the locations in cache memory. The cache memory also has several cache latches 111 which are located on the solder side of the PCB as shown in FIG. 3. The host bus 140 permits the processor to communicate directly to the cache 95. The main memory 100 is shown as comprising eight Dynamic Random Access Memory (DRAM) chips which are located on the solder side of the board as shown in FIG. 3. DRAMs are used for the main memory since they have high storage capacities. The main memory also has several memory control buffers 110 which are located on the solder side of the PCB. The main memory 100 can communicate directly with the processor through the host bus 140 also. There are also several other components, as described herein and shown in FIG. 4, which are electrically connected to the host bus 140.

A cache and DRAM controller (CDC) 60 is electrically connected to the host bus 140, the main memory 100, the cache 95 and a peripheral component interconnect (PCI) bus 145. The CDC 60 is located on the component side of the printed circuit board as shown in FIG. 2. The CDC is running at 33 Mhz using 5 volt technology (Intel Part No. 82424TX) and controls access to both the main memory 100 and the cache memory 95. The CDC 60 also has a stop clock system management mode (SMM) 55 and a 33 Mhz oscillator 65 electrically connected to it. The oscillator 65 in combination with the SMM 55 provides timing signals to the CDC 60 for memory access timing purposes and provides timing signals to the processor 50. The P24C processor 50 then triples the oscillator frequency internally to get a 100 Mhz processor speed. The oscillator and the SMM are located on the component side of the printed circuit board (PCB) in between the processor 50 and the CDC 60.

A data path unit (DPU) 85 (Intel Part No. 82423TX) is also electrically connected to the host bus 140 and the PCI bus 145 and runs at 33 Mhz using 5 volt technology. The DPU 85 controls the flow of data on the host bus 140 as well as on the PCI bus 145. The DPU 85 is also electrically connected to the main memory 100 and controls data transfer between the main memory, the host bus 140 and the PCI bus 145. The DPU is located on the component side of the PCB as shown in FIG. 2 below the oscillator 65.

The PCI bus 145 is an electrical connection between the CDC 60, the DPU 85 and a bridge application specific integrated circuit (ASIC) 90 and is 32 bits wide. The PCI bus 145 has a maximum length problem which is solved by the bridge ASIC 90. The bridge ASIC effectively divides the PCI bus into two parts. One part of the PCI bus is in the PPM and the other part is in the docking station. In the docking station the PCI bus 525 electrically connects the PPM to peripherals, local area networks (LAN) and graphic controllers.

The bridge ASIC separation is necessary to help control the impedances of the bus lines and for allowing more devices on the PPM as well as on the docking station to be connected to the respective PCI buses without violation of the loading specifications. Also since the bridge ASIC 90 creates two buses, the overall effective length of the PCI bus has been doubled.

The bridge ASIC 90 interfaces to three buses. One bus is the PCI bus that goes to the docking connector 25 which when connected to the docking station goes on to create the PCI docking station bus 525.

The PPM PCI interface of the bridge ASIC 90 at the docking connector 25 is capable of 5 volt or 3.3 volt signaling as defined in the PC specification. This feature allows the PPM to configure itself to docking stations that use either PCI 5 volt signaling or PCI 3.3 volt signaling. It is anticipated that initial implementations of the docking stations will use 5 volt signaling. In future implementations of the docking stations, especially notebooks, will use 3.3 volt signaling. Since the bridge ASIC 90 of the PPM is automatically configurable to either type of signaling, the PPMs will always be compatible with both type of docking stations.

The bridge ASIC 90 in this embodiment electrically connects the docking connector 25 to the PCI bus 145 and the ATA bus 150. The bridge ASIC 90 in this embodiment will convert the 5 volt or 3.3 volt signals at the docking connector 25 to 5 volt signals of the PCI bus 145 and ATA bus 150.

The bridge ASIC 90 acts as a bridge between the PCI bus 145, the ATA bus 150 and the docking station PCI bus 525. The bridge ASIC is located below the processor 50 on the component side of the PCB.

Similarly, the DPU 85 acts as a bridge between the host bus 140 and the PCI bus 145. These two bridges mean that the host bus is decoupled from the docking station by two bridges which permit easy processor upgrades without affecting any of the other architecture within the PPM. Similarly, any other component of the PPM can be upgraded without significant altering of the rest of the PPM's architecture.

The docking connector 25 connects the personal processor module (PPM) to a docking station via a 32 bit wide connection. The docking connector can also be used for a 64 bit connection, but that wide a data path is not used for this embodiment. Data to the docking station and from the docking station pass through the docking connector to the bridge ASIC 90. The ATA bus 150, which is connected to the bridge ASIC 90 is a 16 bit wide bus which electrically connects the bridge ASIC 90 to, for example, the hard disc 30, a flash Read Only Memory (ROM) 135 and a real time clock (RTC) 70. The hard disc 30 is a conventional 2.5" hard disc drive preferably 200 Mb in size running at 5 volts. The flash ROM 135 is 512K×8 bits in size and stores the basic input/output system (BIOS) for the personal processor module and the configuration information. The flash ROM is used for the BIOS and configuration since only a small amount of storage is required and the BIOS and configuration must be stored even when the computer is powered down. In addition, the configuration information can be easily updated by "flashing" the ROM with a 12 volt signal. When the PPM is booted up, a shadow copy of the BIOS and the configuration information is loaded into main memory so that the flash ROM 135 can be placed in stand-by mode after start-up to conserve power. The flash ROM 135 is located on the solder side of the PCB near the main memory 100.

A table exists non-volatile random access memory in each particular docking station which contains an identification (ID) of each PPM which has been plugged into that particular docking station before. When a PPM is plugged into a docking station and booted up, the PPM will check the table in the docking station for its own ID. If the PPM finds its own ID, then the PPM will automatically configure itself. Having the PPM look for its own ID will eliminate the need for uniquely storing an ID number in each docking station, which is a difficult and expensive process.

When a PPM is docked into a docking station, the PPM is automatically configured by software. For a first-time configuration (i.e., when the PPM is inserted into a particular docking station for the first time), the configuration is performed interactively with the use. During the configuration, all of the docking station's specific configuration information is loaded into a storage area in the PPM. If the PPM is booted up in the same docking station which it was previously shut down in, then the PPM will know that it is in the same docking station and perform minimum configuration sequences automatically. If the PPM is booted up in a docking station which the PPM has been in before, the PPM will scan a table in its storage area to find the particular configuration information for the particular docking station and then automatically configure itself.

The RTC 70 actually consists of several components such as a real time clock 70, a battery for the real time clock 75 and a crystal 80 for timing the real time clock. The real time clock components are located on the component side of the PCB near the DPU 85. The RTC 70, in combination with the RTC battery 75 and the RTC oscillator 80, provide each separate PPM with its own local clock. This local clock is important to travelers who may run their PPM in different time zones, but do not want to have to constantly change the time and date. In essence, each PPM is its own universe which is unaffected by outside time zones.

The layout and electrical connects shown in FIGS. 2,3 and 4 allow a PPM using a P24C processor to be small enough to fit within a desktop docking station and cool enough so that the PPM meets all governmental heat requirements. To fit a P24C based PPM within a notebook docking station where the height limit in 1", a second embodiment of the PPM is disclosed below.

Now, with reference to FIGS. 5a, 5b and 5c, a case 195 which will house a second embodiment of the PPM will be described. In this embodiment of the present invention, a P24C processor made by Intel Corporation will be incorporated within the case with a 2.5" hard disc drive 30 and a pair of printed circuit boards (PCBs). A pair of side walls 200,205 of the case are preferably made of aluminum. The side walls 200, 205 have dimensions of 1 inch (25.46 mm) high by 5.28 inches (134.16 mm) long. A top wall 220 and a bottom wall 225 of the case are also preferably made of aluminum and have dimensions of 4.30 inches (109.09 mm) wide and 5.28 inches (134.16 mm) long. A front wall 210 and a back wall 215 are also preferably made of aluminum and have dimensions of 1 inch (25.46 mm) high by 4.30 inches (109.09 mm) wide. All of these walls form the case 195 which houses the processor, the hard disc drive and the printed circuit boards. Preferably, the case 195 is sealed so that no external contaminants can enter the housing.

Figure 5A:
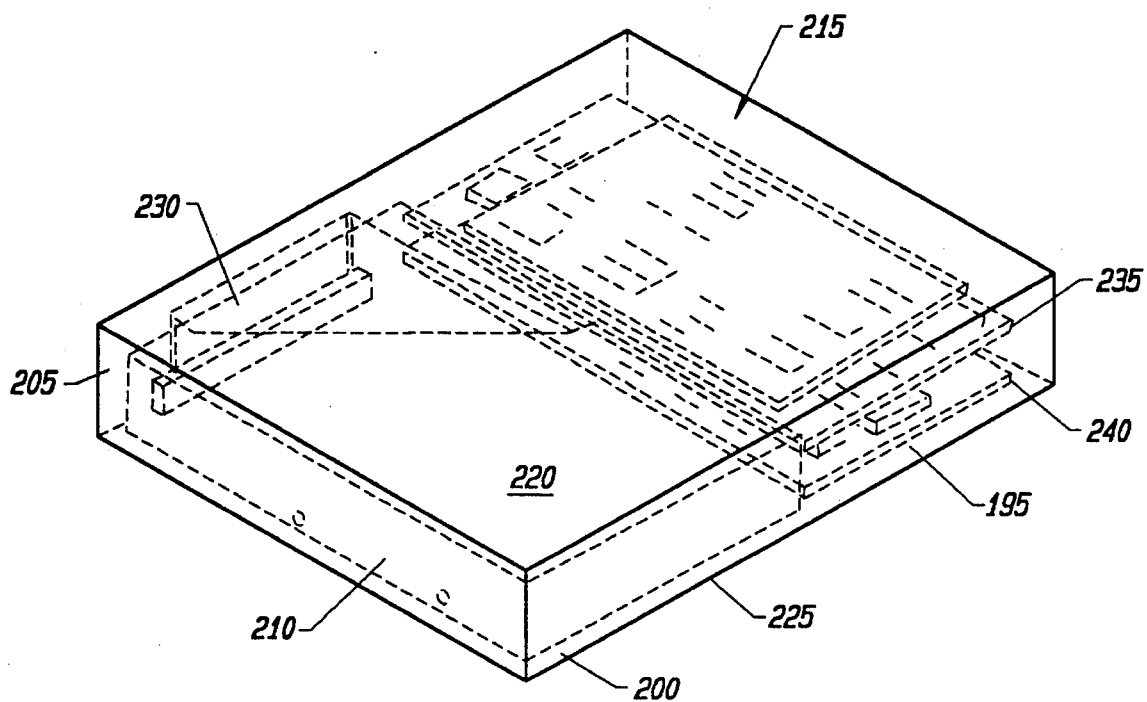
FIG. 5a is an isometric view of a second embodiment of a case and internal components of a PPM which uses a P24C processor and two printed circuit boards.
Figure 5B:
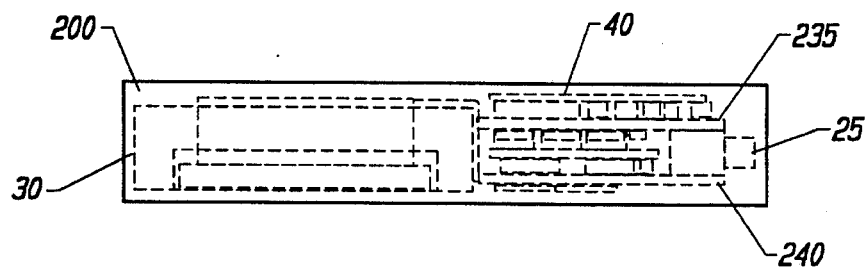

FIG. 5b shows a side view of the case 195 for the PPM. As is shown, a hard disc drive 30 is located adjacent the bottom wall 210. A Flex-circuit 230 connects the hard disc drive 30 to one of the printed circuit board. The two PCBs 235, 240 are located horizontally adjacent the disc drive in the case. In addition, the two PCBs are stacked directly on top of one another. In between the upper PCB 235 and the lower PCB 240 is a liquid heatsink 45 which helps to transfer heat away from the solder side of the upper PCB and the component side of the lower PCB. The operation of the liquid heatsink 45 will be described more completely below. The printed circuit boards 235,240 have a number of components attached to them which will be described with reference to FIGS. 6–9 below. The printed circuit boards 235, 240 also have a 200 pin docking connector 25 connected between the two PCBs.

The docking connector 25 must be highly reliable and is preferably an AMP 200 position connector which can handle in excess of 5000 connection. In addition, since the docking connector 25 has two hundred pins, pins are available for both 5 volt supply and 3.3 volt supply which allows compatibility with both 5 volt components and 3.3 volt future components. Also, since the docking connector 25 is universal for all PPMs and docking stations, a PPM which is used for a notebook docking station can also be used with a desktop docking station. Finally, since the docking connector 25 can handle 64 bit and 32 bit signals, the PPM can be plugged into both 32 bit systems (probably notebook systems) and 64 bit systems (probably desktop computers).

The docking connector 25 is located adjacent the back wall 215 of the case since the connector must electrically connect the PPM to the docking station when the PPM is docked. Another liquid heatsink 40 is also located directly above the upper PCB 235. This liquid heatsink also helps cool the components located on the printed circuit board and transfer any heat generated to the case 195. The operation of the liquid heatsink will be described more fully below. FIG. 5b shows a side view of the case 195 and the side by side alignment of the hard disc drive, and stacked printed circuit boards and heatsinks.

Figure 5C:
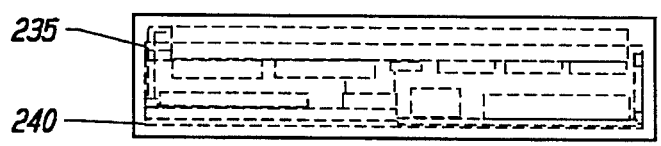

FIGS. 6–9 show the physical layout of the components on the printed circuit boards 235, 240 shown in FIGS. 5a, 5b and 5c. FIG. 4 shows the electrical connection between the various components shown in FIGS. 6–9. In this particular embodiment, two PCBs 235, 240 are used. The upper PCB 235 is 4.09 inches (104 mm) long and 2.02 inches (51.33 mm) wide. The lower PCB 240 has the same dimensions. The layout of the components and the size of the printed circuit board are such that the PPM within this case can easily fit into a notebook computer docking station.

This embodiment of the present invention, with two PCBs and a P24C processor, has many of the same components as the first embodiment so that all like numerals denote like components which will not be described in great detail. The electrical connections, as shown in FIG. 4, are identical for the first and second embodiments. The main difference between the two embodiments is the layout of the components which will be described.

Figure 6:
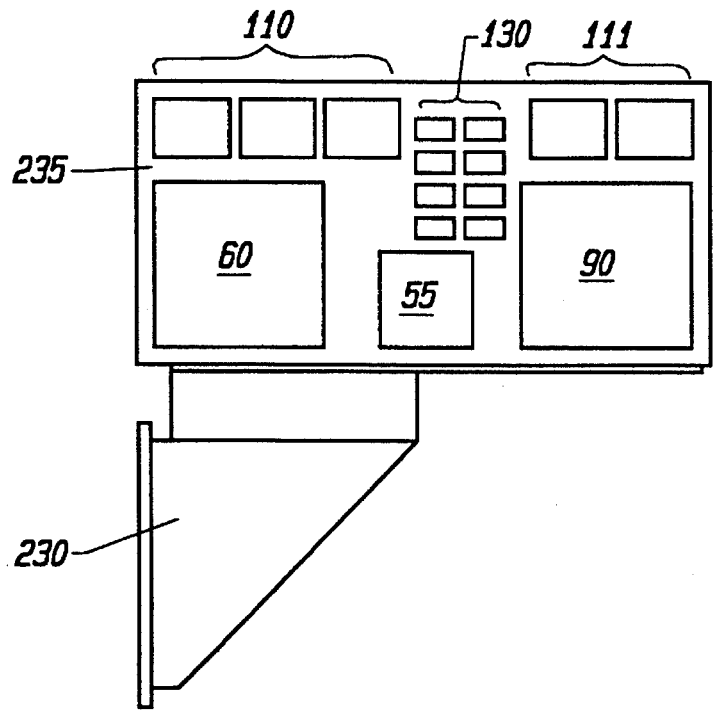
Figure 7:
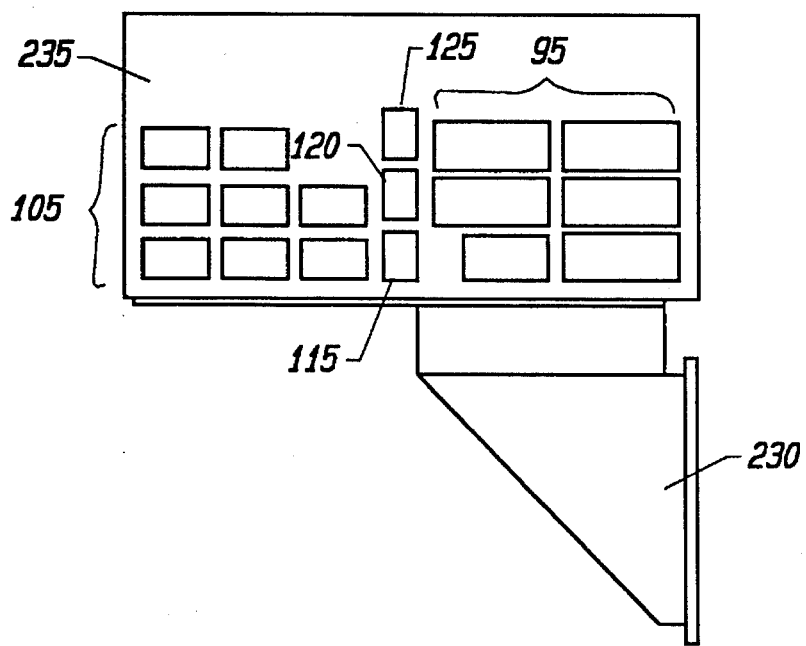

FIGS. 6 and 7 show the layout of components on the component and solder side of the upper PCB 235. The component side of the upper PCB 235, as shown in FIG. 6, has the bridge ASIC 90 and the CDC 60 located near the bottom side of the PCB. The SMM 55 is located between the CDC 60 and the bridge ASIC 90. Above the CDC 60 are the memory control buffers 110. Above the bridge ASIC 90 are the cache latches 111. The flex circuit 230 which electrically connects the disc drive to all of the other components on the PCBs is located near the bottom left corner of the PCB. The solder side of the upper PCB 235, as shown in FIG. 7, has the resistor packs 105 located near one side of the PCB and the cache memory 95 located near the other side of the PCB. In between the cache memory and the resistor packs are the miscellaneous glue function chips 115, 120, 125.

Figure 8:
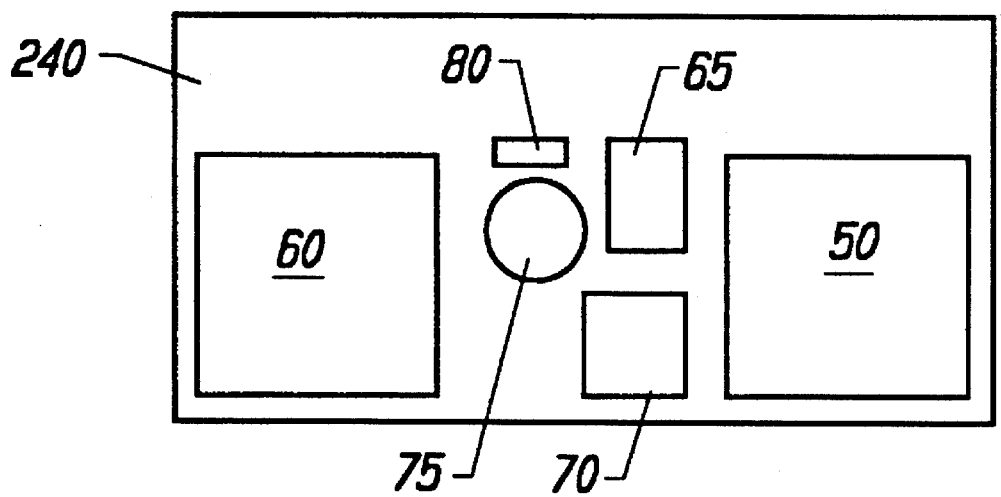
Figure 9:
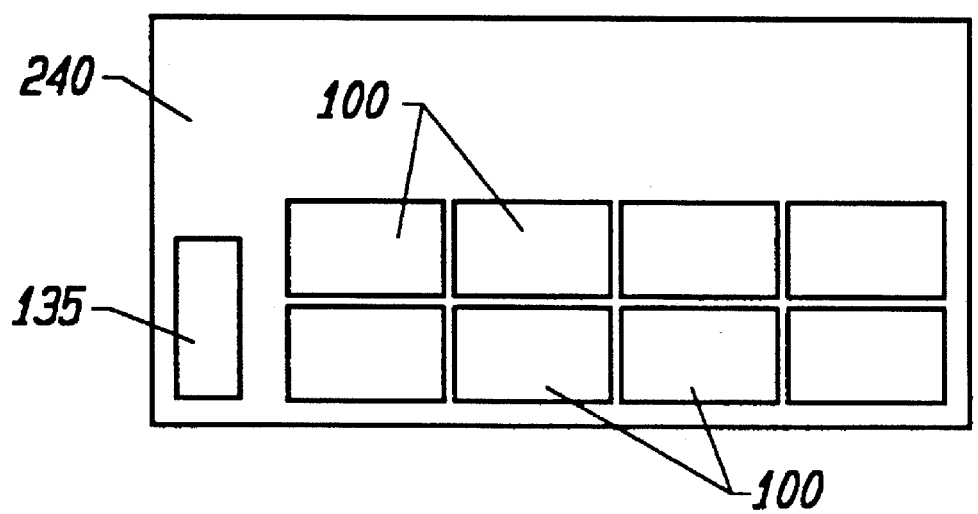

FIGS. 8 and 9 show the physical layout of components on the component and solder side of the lower PCB 240. The P24C processor 50 and the CDC 60 are located near the bottom of the component side of the lower PCB, as shown in FIG. 8. The RTC 70, the RTC's battery 75, the RTC's crystal 80 and the oscillator 65 are located between the CDC and processor. FIG. 9 shows the solder side of the lower PCB 240. The solder side has the main memory chips 100 on it and the main memory occupies most of the physical space on the solder side of the lower PCB. The solder side also has the flash ROM 135 located on it. Although the layout of the various components shown in FIGS. 6–9 is different from the layout shown in FIGS. 2 and 3, both embodiments operate in the same manner.

The layout and electrical connections shown in FIGS. 6–9 allow a PPM using a P24C processor to be small enough to fit within any type of docking station including a notebook docking station and cool enough so that the PPM meets all governmental heat requirements.

Now, a third and fourth embodiment of a PPM with a P54C processor will be described with respect to FIGS. 10a, 10b, 10c, 11–15, 16a, 16b, 16c, 17–20. The third and fourth embodiments have a single printed circuit board (FIGS. 10a, 10b, 10c, 11–15) and a pair of printed circuit boards (FIGS. 15, 16a, 16b, 16c and 17–20) respectively. Each of these embodiments will be described below in detail.

Figure 10A:
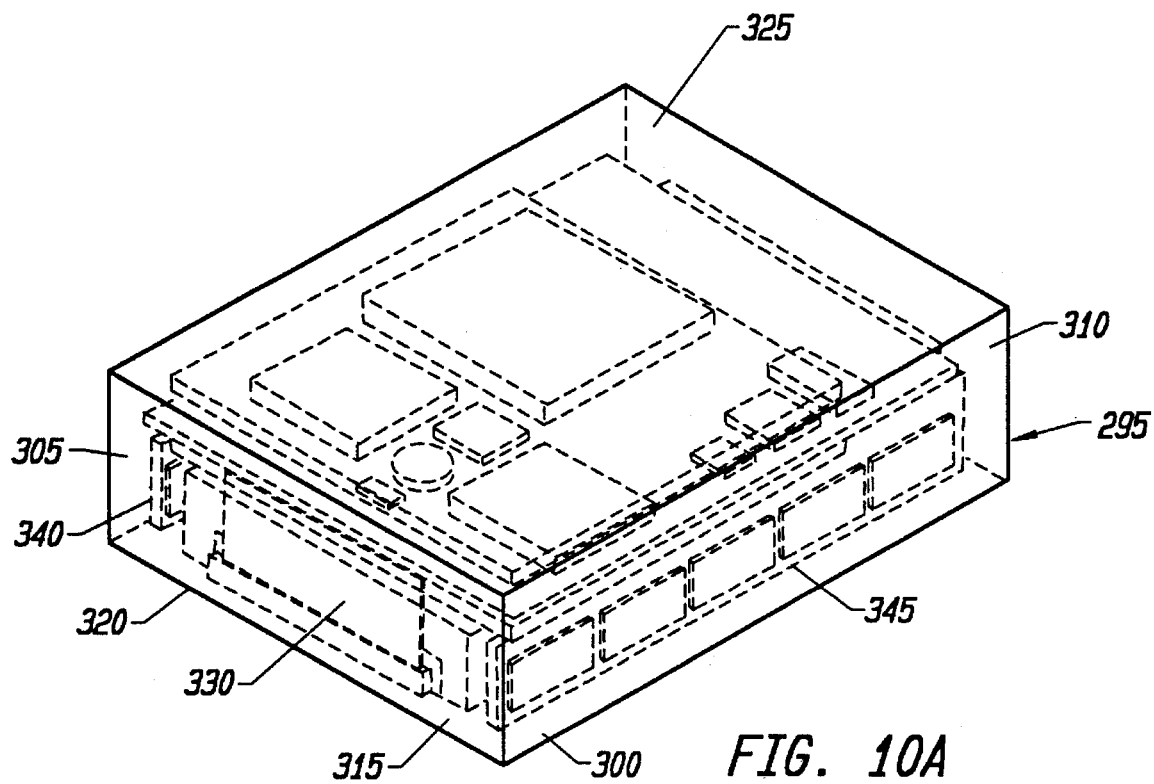
FIG. 10a is an isometric view of a third embodiment of a case and internal components of a PPM which uses a P54C processor and a single printed circuit board.
Figure 10B:
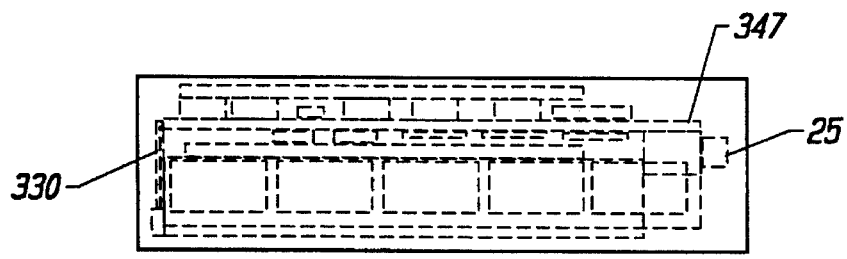
Figure 10C:
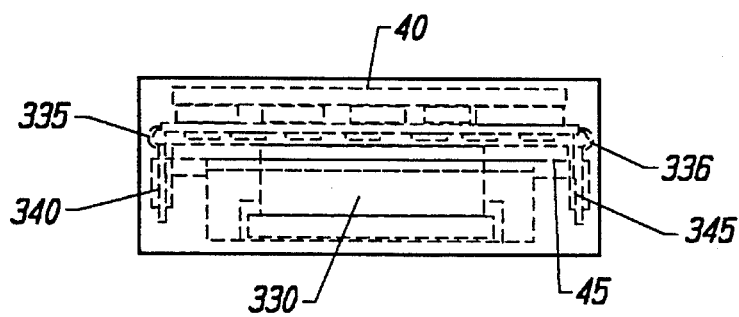

FIGS. 10a, 10b, and 10c show a third embodiment of the present invention wherein a case 295, which is made of a material such as aluminum, is sealed to keep contaminants out of the case. The case 295 is made up of several walls which all have different dimensions. A pair of side walls 300, 305 are 1.48 inches (37.54 mm) high and 5.27 inches (133.84 mm) long. A front wall 315 and a back wall 310 are 1.48 inches (37.54 mm) high and 3.84 inches (97.51 mm) wide. A bottom wall 320 and a top wall 325 are 5.27 inches (133.84 mm) long and 3.84 inches (97.51 mm) wide.

Now, the components and structures within the case 295 will be described. There is a flex circuit 330 within the case 295 which electrically connects the disc drive 30 to a printed circuit board 347. The disc drive 30 is a conventional 2.5" hard disc drive, and is located underneath the printed circuit board 347. There is also a docking connector 25 which is connected to the printed circuit board 347 and connects to the external docking station.

The docking connector 25 must be highly reliable and is preferably an AMP 200 position connector which can handle in excess of 5000 connections. In addition, since the docking connector 25 has two hundred pins, pins are available for both 5 volt supply and 3.3 volt supply which allows compatibility with both 5 volt components and 3.3 volt future components. Also, since the docking connector 25 is universal for all PPMs and docking stations, a PPM which is used for a notebook docking station can also be used with a desktop docking station. Finally, since the docking connector 25 can handle 64 bit and 32 bit signals, the PPM can be plugged into both 32 bit systems (probably notebook systems) and 64 bit systems (probably desktop computers).

There are also a pair of smaller printed circuit boards 340, 345 which are located near the sides of the hard disc drive and have main memory components attached to them. The smaller printed circuit boards 340,345 are electrically connected to the printed circuit board 347 by flex circuits 335, 336. In addition, a heatsink 40 is located above the printed circuit board (PCB) 347 and a heatsink 45 in located beneath the PCB 347. These heatsinks help to conduct heat away from the PCB and the components on the PCB which generate a tremendous amount of heat.

Figure 11:
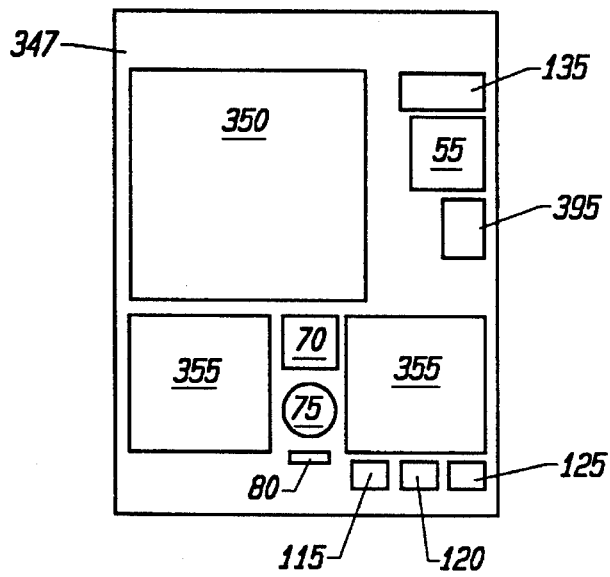
Figure 13:
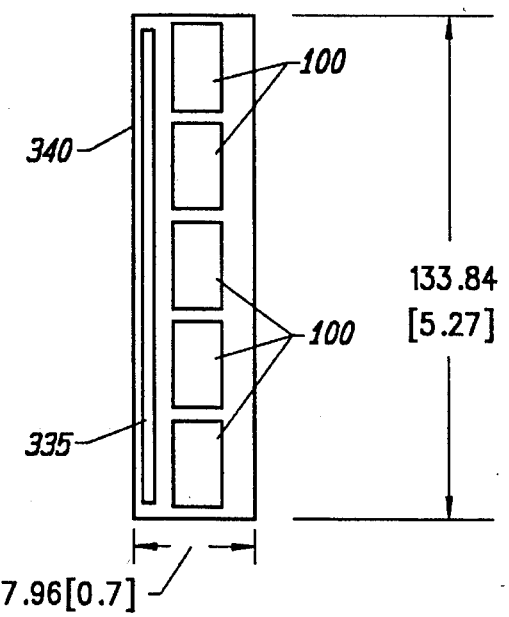
FIG. 13 is a side view of a memory printed circuit board which connects to the printed circuit board shown in FIG. 11.
Figure 12:
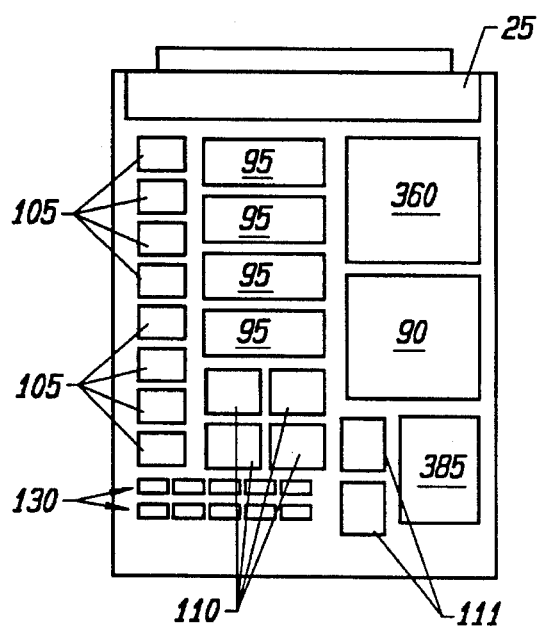
Figure 14:
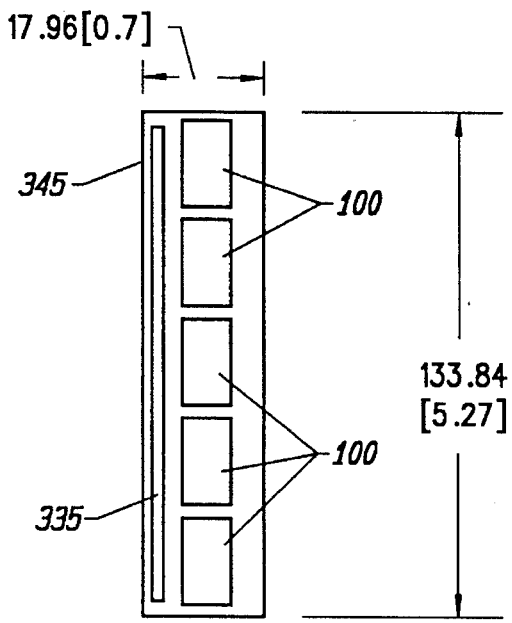
FIG. 14 is a side view of another memory printed circuit board which connects to the printed circuit board shown in FIG. 11.
Figure 15:
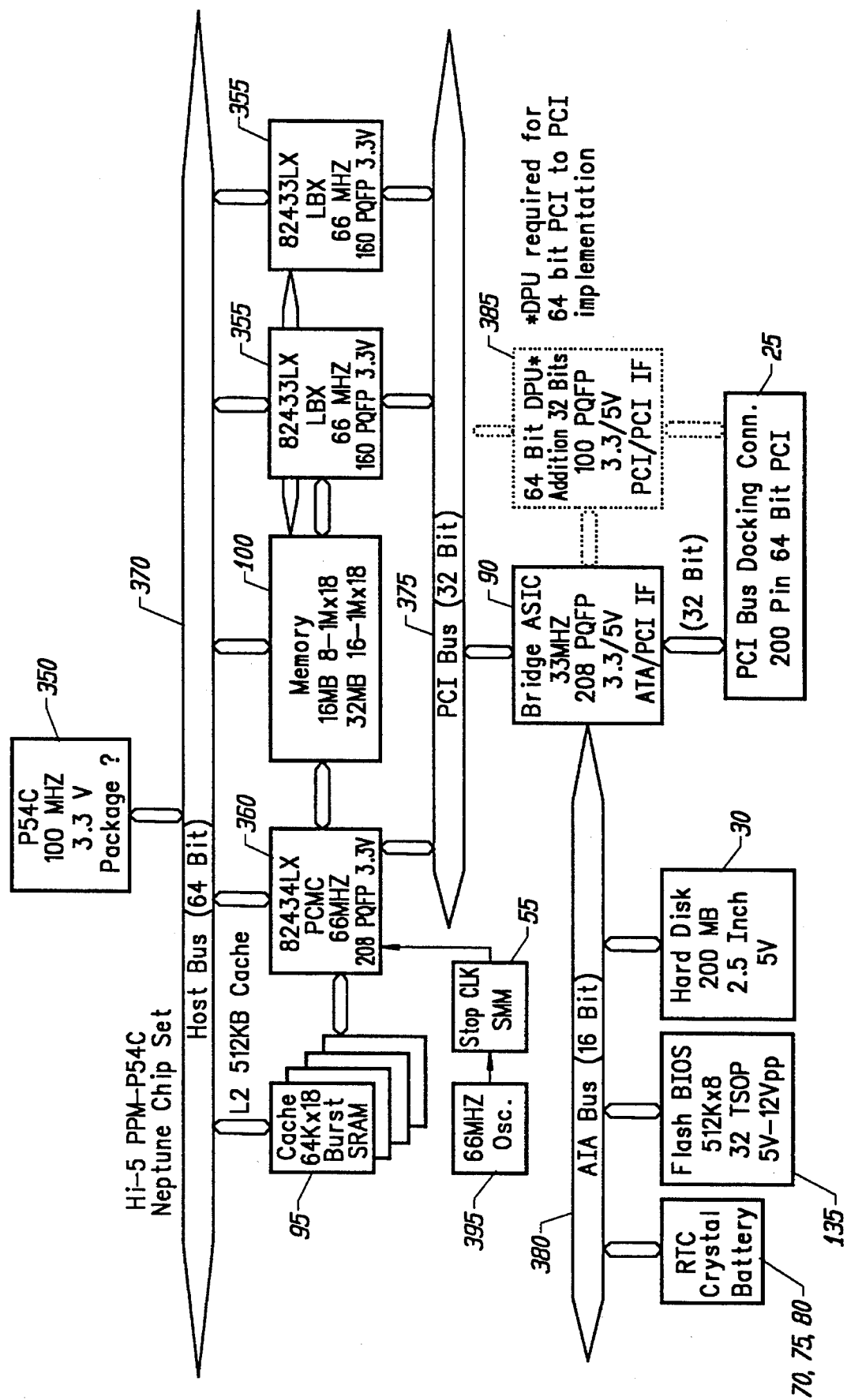
FIG. 15 is a block diagram of the electrical connections between the various components of the third and fourth embodiments which use the P54C processor.

Now, with reference to FIGS. 11, 12, 13, 14, and 15, the layout of the various components on the PCB 347 and the electrical connections of the various components will be described. First, all of the components which have the same numbers as the numbered component in the P24C embodiment are the same component and operate in the same manner unless otherwise noted. For example, the real time clock 70 shown in FIG. 11 is the same real time clock as was previously shown in FIG. 2 and operates in an identical manner. The other identical components will not be described with any detail. The main PCB 347 is made of conventional materials and is 3.54" (90 mm) wide and 4.73" (120.21 mm) long. The memory PCBs 340, 345 are conventionally made also and are 0.7" (17.96 mm) wide and 5.27" (133.84 mm) long.

Thus, in addition to the identical components, this embodiments also has some distinct differences. A P54C processor 350 is used which runs at 100 Mhz using 3.3 volt technology. The P54C is a 64 bit microprocessor which has a 64 bit wide data and address bus architecture. The P54C processor, manufactured by Intel Corporation, is electrically connected by a CPU host bus 370 which is 64 bits wide to take advantage of the 64 bit wide internal P54C address and data bus. The host bus 370 electrically connects the processor 350 to the cache memory 95, a PCI/cache/memory controller (PCMC) 360, the main memory 100, and two location bus accelerator (LBX) chips 355 and permits data and address transfer between each component.

The PCMC 360 is preferably a 82434LX 66 Mhz 3.3 volt chip manufactured by Intel Corporation, and controls data and address transfer between the processor 350, the cache 95, the main memory 100 and a peripheral component interconnect (PCI) bus 375. The PCMC 360 is also electrically connected to the SMM 55 which in turn is connected to an oscillator 395. Unlike the oscillator used for the P24C processor, the oscillator for the P54C processor is a 66 Mhz oscillator. The P54C processor 350, then three watt's the oscillator speed internally to get the 100 Mhz clock speed.

The two LBXs are preferably 82433LX 66 Mhz 3.3 volt chips made by Intel Corporation and control data and address transfer between the host bus 370 and the processor 350, the PCI bus 375 and the main memory 100. The PCI bus 375 is a 32 bit wide bus which operates with 3.3 volt signals. These 3.3 volt signals which are transmitted by the PCI bus 375 originate from the PCMC 360, the LBXs 355, the bridge ASIC 90 and a data path unit (DPU) 385.

The DPU 385 shown is a device that would be required for a 64 bit implementation of a PPM whereby the internal PPM PCI bus is 64 bits wide. In both the third and fourth embodiments of the P54C, the PCI internal bus is only 32 bits wide and the DPU 385 is shown for reference purposes only.

For other embodiments of the PPM that support an internal PCI bus that, is 64 bits wide for higher performance, these PPMs may operate with either 32 or 64 bit docking stations and will automatically configure themselves to the proper bus width in accordance with the PCI bus specification.

The bridge ASIC 90 acts as a bridge between the PCI bus 375 and the docking station which is connected to the docking connector 25. Similarly, the LBX chips 355 act as a bridge between the host bus 370 and the PCI bus 375. These two bridges mean that the host bus is decoupled from the docking station by two bridges which permit easy processor upgrades without affecting any of the other architecture within the PPM. Similarly, any other component of the PPM can be upgraded without significant altering of the rest of the PPM's architecture. The bridge ASIC 90 also isolates the PCI bus 375 of the PPM from the PCI bus 525 of the docking station in order to control the loading of the PCI buses and allow more devices to be attached to each PCI bus. As shown, the docking connector 25 can operate with both 32 bit signals from the bridge ASIC 90 and 64 bit signals from the DPU 385.

In addition to being electrically connected to the PCI bus 375, the bridge ASIC 90 is also connected to the DPU 385, the docking connector 25 and an ATA bus 380. The ATA bus 380 is a 16 bit wide bus which electrically connects the bridge ASIC 90 to a number of components which operate at 5 volts. These components are the hard disc drive 30, the flash ROM 135 and the real time clock (RTC) 70, 75, 80.

The memory printed circuit boards 340, 345 which are electrically connected to the printed circuit board 347 by flex circuits 335, 336 contain the DRAM chips which make up the main memory 100 of the PPM. This embodiment of the PPM fits within a desktop docking station whereas the fourth embodiment of the PPM, described below, will also fit within a notebook docking station as well.

Figure 16A:
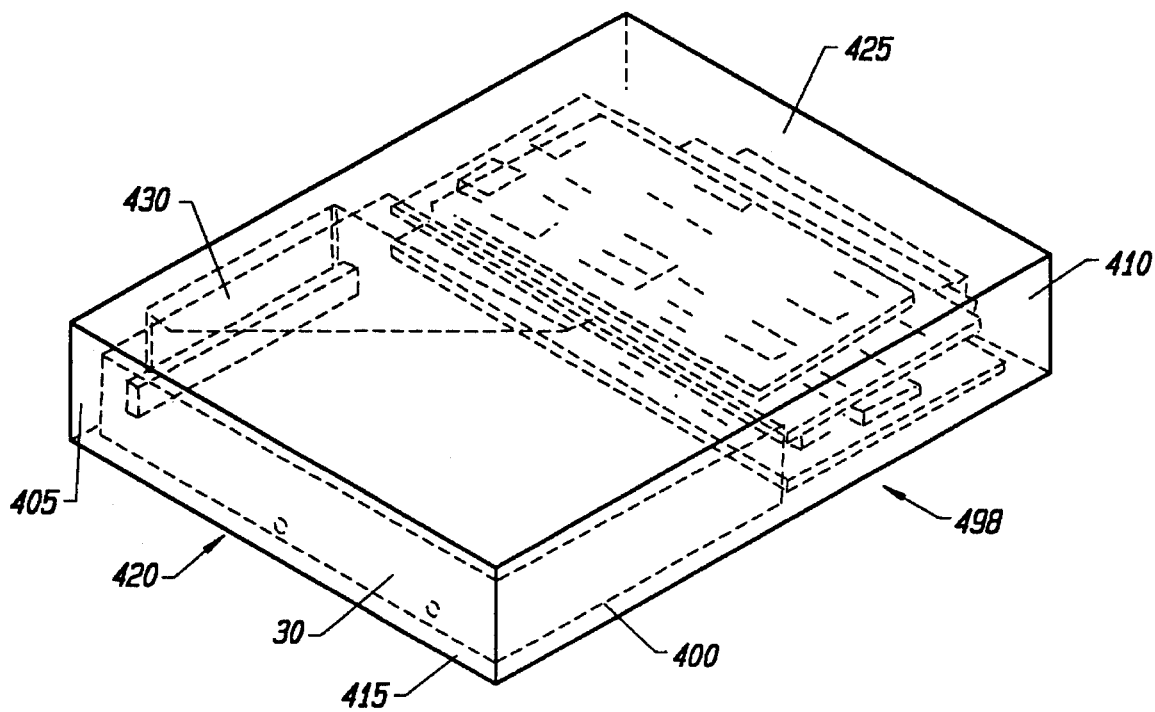
FIG. 16a is an isometric view of a fourth embodiment of a case and the internal components of a PPM which uses a P54C processor and two printed circuit boards.
Figure 16B:
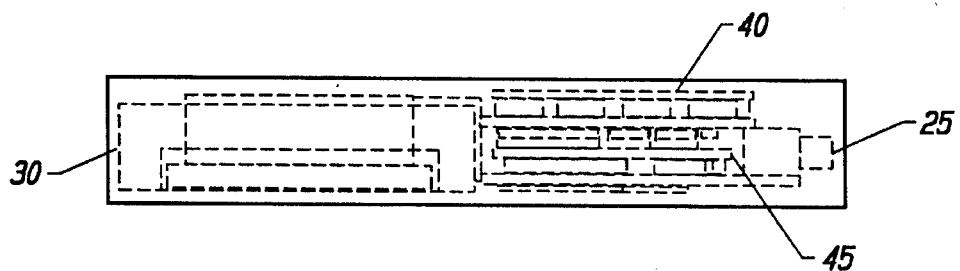
Figure 16C:
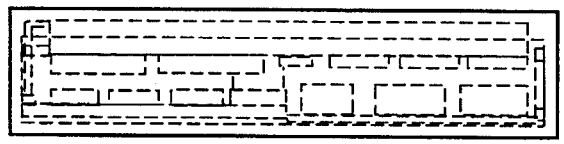
Figure 17:
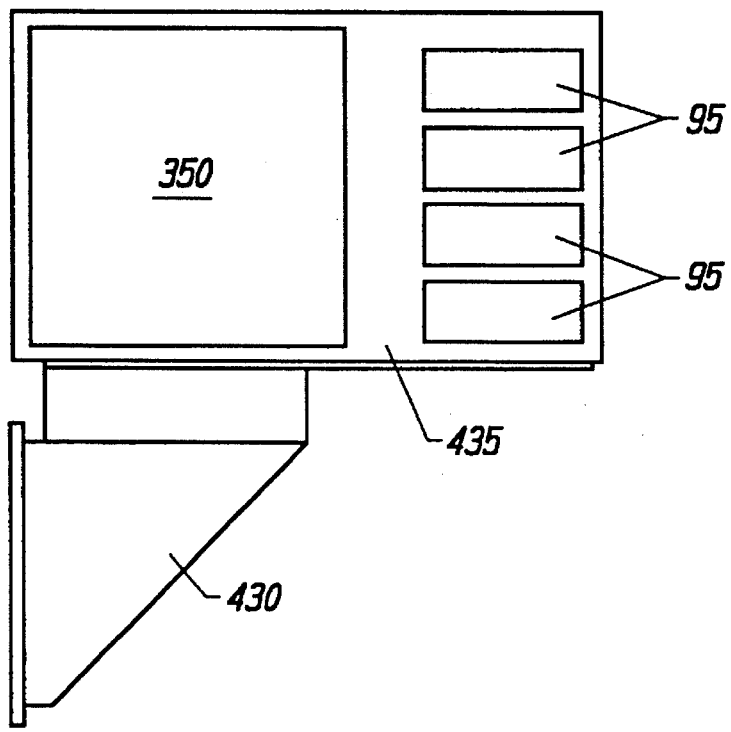

Now, a fourth embodiment of the PPM using a P54C processor with two printed circuit boards will be described with reference to FIGS. 16a, 16b, 16c, 17–20. FIGS. 16a, 16b and 16c show a case 498 which will house the PPM with a P54C processor and two printed circuit boards. The case 498 is preferably made of aluminum, but the invention is not limited to the material chosen for the case. In this embodiment, the hard disc drive 30 is located beside the two printed circuit boards 435, 440 which are stacked on top of each other. The hard disc drive 30 is electrically connected to the printed circuit boards (PCBs) by a flex circuit 430. In addition, there is a docking connector 25 within the case which electrically connects the PPM to a docking station.

The docking connector 25 should be highly reliable and is preferably an AMP 200 position connector which can handle in excess of 5000 connections. In addition, since the docking connector 25 has two hundred pins, pins are available for both 5 volt supply and 3.3 volt supply which allows compatibility with both 5 volt components and 3.3 volt future components. Also, since the docking connector 25 is universal for all PPMs and docking stations, a PPM which is used for a notebook docking station can also be used with a desktop docking station. Finally, since the docking connector 25 can handle 64 bit and 32 bit signals, the PPM can be plugged into both 32 bit systems (probably notebook systems) and 64 bit systems (probably desktop computers).

The case 498 construction will now be described. A pair of side walls 400, 405 are 1 inch (25.46 mm) high and 6 inches (152.40 mm) long. A back wall 410 and a front wall 415 are 1 inch (25.46 mm) high and 4.3 inches (109.09 mm) wide. A bottom wall 420 and a top wall 425 are 4.3 inches (109.09 mm) wide and 6 inches (152.40 mm) long. These walls are attached together in such a way that the case 498 is sealed.

The two PCBs 435, 440 have a liquid heatsink 40 which is located on top of the components which are attached to the upper PCB 435. Another liquid heatsink 45 is located on top of the components of the lower PCB 440 and between the two PCBs. These liquid heatsinks transfer heat away from the components on the PCBs to the case 498. The case is then cooled by forced air flow from a fan. The case also contains the same docking connector 25 as shown in all of the previous embodiments.

Now, the layout of the various components on the upper PCB 435 and the lower PCB 440 will be described. The upper PCB 435 is conventionally made and is 2.44" (62.01 mm) wide and 4.09" (104 mm) long. The lower PCB 440 is also made conventionally and is 2.74" (69.57 mm) wide and 4.09" (104 mm) long. The electrical connection of the various components is the same as for the previous embodiment using a single PCB (See FIG. 15). The P54C processor 350 is located on the component side of the upper PCB 435. Next to the processor on the component side of the upper PCB is the cache memory 95 which consists of four SRAM chips.

Figure 18:
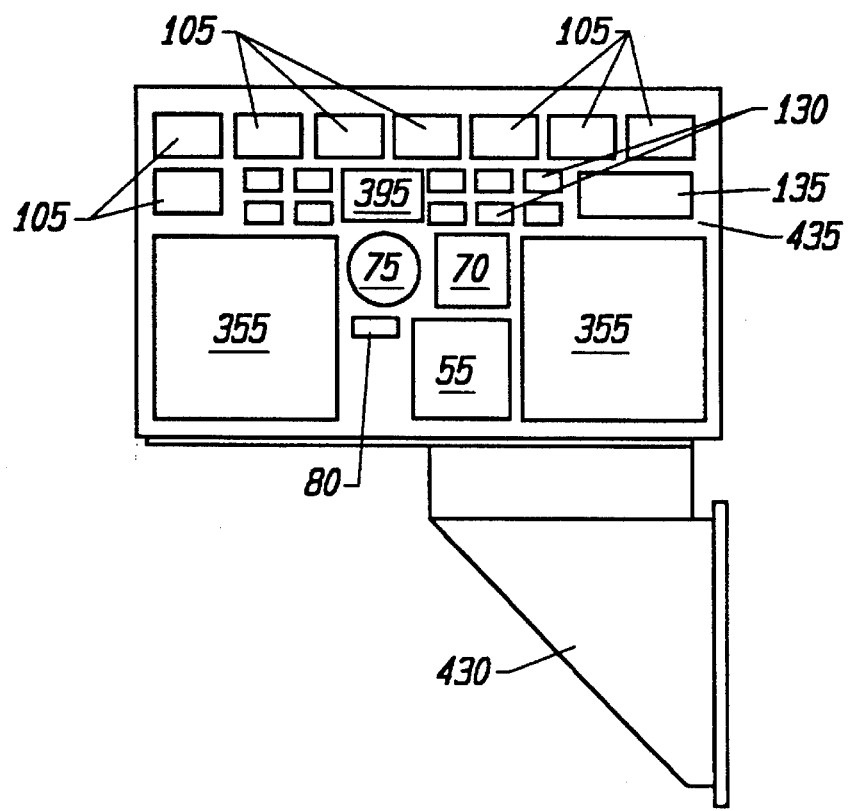

On the solder side of the upper PCB, shown in FIG. 18, the two LBX 355 chips are located at the bottom corners of the PCB. In between the LBX chips are the SMM 55, the RTC 70, the RTC battery 75, and the RTC crystal 80. Above the LBX chips, the resistor packs 105, the oscillator 395 for the processor, the flash ROM 135, and the interface chip 130 are located.

Figure 19:
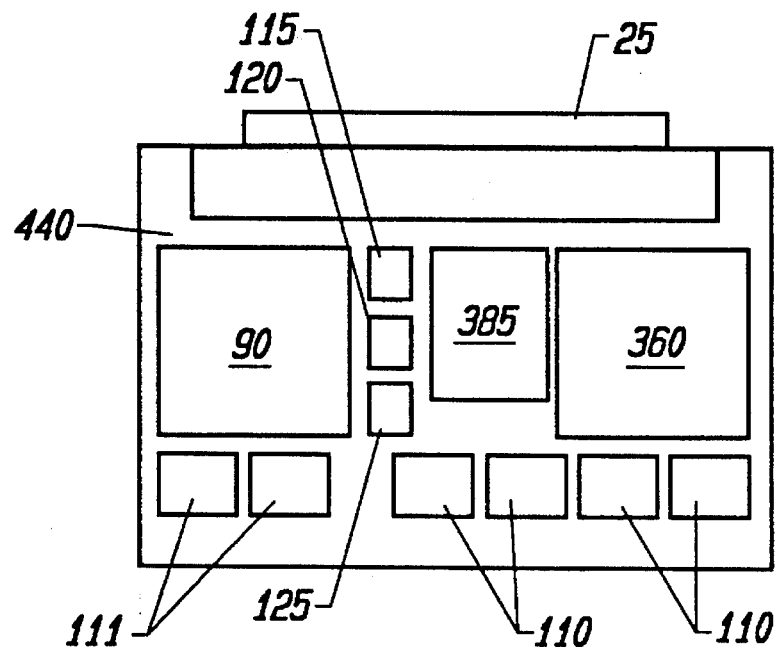

On the component side of the lower PCB 440, as shown in FIG. 19, the docking connector 25 is attached to the upper edge of the PCB. The bridge ASIC 90, the PCMC 360 and the DPU 385 are located below the docking connector in the middle of the PCB. At the bottom of the component side of the lower PCB, the memory control buffer chips 110 and the cache latch chips 111 are located.

Figure 20:
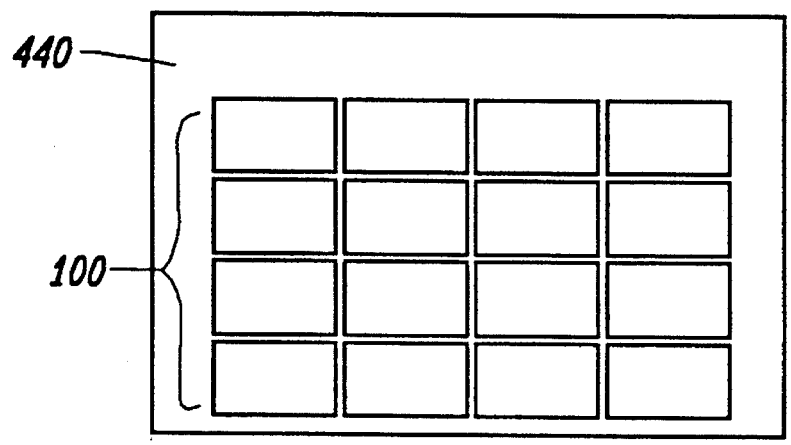

Finally, on the solder side of the lower PCB 440, as shown in FIG. 20, all of the main memory 100 DRAM chips take up the entire solder side of the lower PCB. This embodiment of the PPM will fit within a notebook docking station. Thus, only the second and fourth embodiments of the PPM will fit within both a desktop and a notebook docking station.

Figure 21:
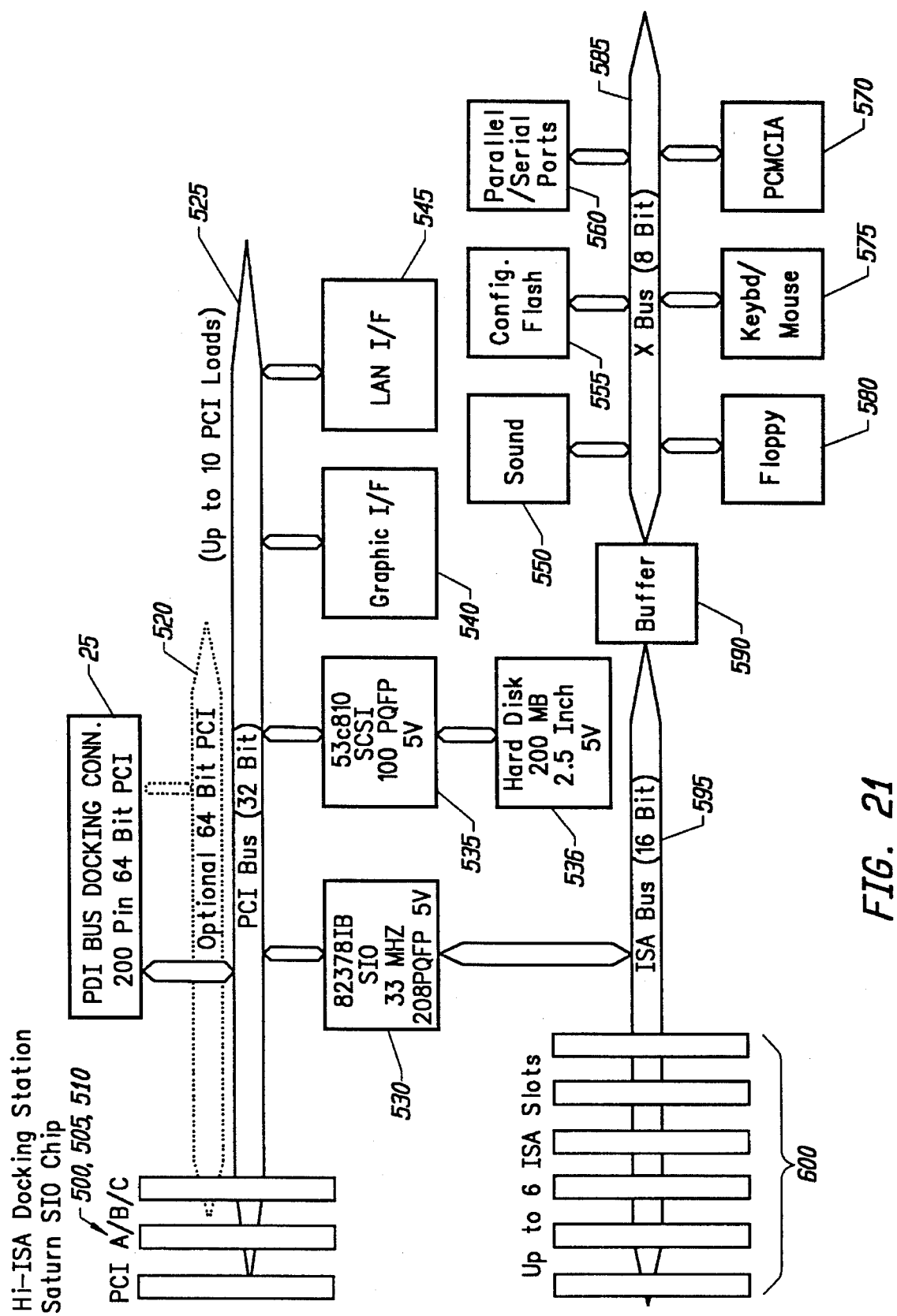
FIG. 21 is a block diagram showing the electrical connections between any other the embodiments of the PPM and a docking station.

Now, the electrical connections between the PCI docking connector 25 and the docking station architecture will be described with reference to FIG. 21. The PCI docking connector 25 which transfers electrical signals from the PPM to the docking station is either 32 or 64 bits wide. If the PCI docking connector is 64 bits wide, then a 64 bit PCI bus 520 is used to electrically connect the docking connector to all other PCI loads. If a 32 bit wide docking connector is used, then a 32 bit wide PCI bus 525 is used. Both the 32 bit wide PCI bus and the 64 bit wide PCI bus operate in the same manner and only the 32 bit wide PCI bus will be referred to hereafter. The PCI bus 525 electrically connects up to 9 additional PCI compatible devices to the docking connector 25. Three PCI expansion bus slots 500, 505, 510 are shown. The PCI bus 525 is also electrically connected to a system input/output controller (SIO) 530, a small computer serial interface controller (SCSI) 535 a graphics interface 540 and a Local Area Network (LAN) interface 545, for example. The PCI bus can also be connected to additional PCI compatible devices.

The LAN interface 545 allows the PPM to communicate with other external devices or other users via local area network. The SCSI controller 535 is preferably a 53C810 part which operates at 5 volts and is electrically connected to a hard disc 536 which is housed within the docking station. The hard disc 536 is preferably a 200 Mb 2.5" hard disc drive running at 5 volts. The SIO 530 is running at 33 Mhz and 5 volts and controls the transfer of data between the PCI bus 525 and an Industry Standard Architecture (ISA) bus 595. The ISA bus is a 16 bit wide bus which is used by most IBM compatible personal computers. The ISA bus 595 is also electrically connected to up to six ISA slots 600 which allow a user to place additional cards into the computer. The additional cards may be graphics accelerators, modems or other upgrades. The ISA bus is also electrically connected to a buffer 590 which converts the 16 bit wide signals from the ISA bus into 8 bit wide signals which can be transferred over an X bus 585.

The X bus 585 is an 8 bit wide bus which transmits electrical signals between various input/output devices. For example, as shown in FIG. 21, a sound port 550, a configuration area 555, parallel and serial ports 560, a floppy disc drive 580, a keyboard and mouse 575 and a personal computer modular communications interface adapter (PCMCIA) 570 are electrically connected to the X bus. Additional input/output devices may be connected to the X bus.

Now, the cooling mechanism for the PPM will be discussed. In general, for the PPM, hear management is provided by conduction cooling and power management combinations of hardware and software. The actual components of the PCBs within the case must be cooled by some mechanism which will transfer heat from the components to the case surface. The mechanism is, for example, heat conductive wiring on the PCB, heat sinks or liquid heatsink and heat pipes. In all of the embodiments disclosed, a liquid heatsink is shown, but the invention is not limited to liquid heatsinks and can use any mechanism for transferring heat from the components to the case.

In addition to the liquid heatsinks, components have been placed on the PCBs according to their heat dissipation. For example, since most of the heat is generated by the processor (about eight watts), the processor chip as well as any other major power consuming parts are installed on the top PCB. Thus, these high heat generation components have a liquid heatsink located directly on top of them which is in contact with the top wall of the case so that heat can be quickly transferred from the component to the top wall. Other components which are not located on the top PCB are cooled similarly, but the heat is dissipated through the side walls instead of the top wall.

Once the heat has been removed from the components and transferred to the case's outer surface, it must be dissipated to the air. Originally, it was thought that the case could be cooled by ambient air only. However, a thermal analysis of the PPM showed that the PPM could not be cooled by ambient air alone.

Thus, to effectively cool the case in the desktop environment, forced air flow must be used (i.e., a fan or other device must force air across the case). In the desktop docking environment, a fan can be installed into the docking station. A thermal case study showed that a PPM with head pipes on the top surface could be sufficiently cool with cooling while dissipating 25 watts of power.

For the notebook docking environment, on the other hand, there is no space for a fan so other alternatives must be used. In particular, for the notebook docking station, the power dissipated by the processor, memory, hard disc and other components is controlled via power management integrated circuits and software. The power management used in the PPM is compatible with Intel/Microsoft APM specifications, system management interrupt (SMI) specifications and SMM specifications. By using these power management techniques, the normal twenty-five watt power dissipation can be reduced to less than fifteen watts which can be cooled without an external fan. These power management modes are required for docking the PPM in a notebook docking station and for compatibility with the EPA "Green PC" specification.

Modifications and improvements to the present invention may become apparent to a person of ordinary skill in the art who has studied the subject invention disclosure. Therefore, the subject invention is to be limited only by the scope of the following claims.

We claim:

1. A computer system module having high performance and transportability, known as a personal processor module (PPM), for use with any one of a plurality of external clocking stations, each said docking station providing necessary computer system components not provided by said PPM so that said PPM and said docking station when coupled together form an operational computer system, said PPM being operable solely when coupled with one of said docking stations, said necessary computer system components provided by said docking station comprising a power supply, an input device, and an output device; said docking station further comprising a docking station connector for electrically connecting said docking station to said PPM, said PPM comprising:

a case having a top and bottom wall, a pair of side walls and a front and back wall;

a docking connector which is securely attached to one of said walls of said case;

at least one printed circuit board (PCB) which fits within said case and is electrically connected to said docking connector and has components of said PPM attached to and electrically connected to said PCB, said components including a processor and related logic including a memory;

a mass storage device which fits within said case and is electrically connected to said printed circuit board and which provides data storage for said processor and related logic;

cooling means adjacent said at least one printed circuit board within said case and also adjacent to one of said walls of said case for transferring heat away from said components of said PPM to said walls of said case;

wherein said components of said PPM further comprise a bridge device for coupling a bus in said PPM in said docking station via said docking connector, said bridge device providing PPM bus to docking station bus communication and bus signal conditioning including bus signal isolation and bus signal voltage conversion when required, said bridge device being adaptable to alter said communication and said bus signal conditioning in response to modifications to said PPM components so that said PPM is easily upgradeable and retains compatibility with unmodified ones of said docking station;

said processor, said related logic, and said mass storage device being driven by said power supply of said docking station and exchanging data with said docking station only via said docking connector.

2. The computer system module of claim 1 wherein said mass storage device is electrically connected to said at least one printed circuit board by a flex-circuit.

3. The computer system module of claim 1 wherein said case is made of aluminum and is sealed.

4. The computer system module of claim 1 wherein said case is made of magnesium and is sealed.

5. The computer system module of claim 1 wherein said case has a maximum height of about one inch such that said case with said PPM inside fits within a docking station of a notebook computer.

6. The computer system module of claim 1 wherein said mass storage device is a 2.5" hard disc drive.

7. The computer system module of claim 6 wherein said docking connector is 32 bits wide.

8. The computer system module of claim 6 wherein said docking connector is 64 bits wide.

9. The computer system module of claim 1 wherein said docking connector has a plurality of electrical pins whereby both 5 volt signals and 3.3 volt signals are transferable, and wherein said system supports the coexistence of 3.3 volt and 5 volt devices.

10. The computer system module of claim 1 wherein said docking station is provided in a desktop computer which includes means within said docking station for forcefully moving air over the exterior surface of said PPM case when said PPM case is docked in said docking station; and wherein said cooling means further comprises:

liquid heatsink means in contact with said at least one printed circuit board within said case and an interior surface of one of said walls for transferring heat from said components on said PCB to said case;

whereby said forcefully moving air moves over an exterior surface of said sealed case and transfers heat from said case to said moving air.

11. The computer system module of claim 10 wherein said means for forcefully moving air is a fan.

12. The computer system module of claim 1 wherein said docking station is provided in a notebook computer, and wherein said cooling means further comprises:

liquid heatsink means in contact with said at least one printed circuit board within said case and one an interior surface of one of said walls for transferring heat from said components on said PCB to said case; and power management means for reducing the power dissipated by said PPM so that no external means of cooling said case is required to maintain said PPM within an operationally acceptable temperature range.

13. The computer system module of claim 12, wherein said power management means includes means for reducing the clock rate of said processor.

14. The computer system module of claim 13 wherein said power management means further includes a stop clock system management mode (SMM) means coupled to an oscillator, wherein said oscillator in combination with said SMM provides timing signals to said processor to control the processing execution speed of said processor and thereby controls the heat generated by said processor.

15. The computer system module in claim 1, wherein said mass storage device is a disk drive having a storage capacity of at least about 200 megabytes.

16. The computer system module in claim 1, wherein said bridge device comprises a bridge application specific integrated circuit (ASIC), said PPM bus is a PCI (Peripheral Component Interconnect) bus, and wherein said bridge ASIC effectively divides said PMM PCI bus into two parts including a first part of said PCI bus in said PPM which couples to said processor, and a second part of said PCI bus in said docking station which couples to peripheral devices.

17. The computer system module in claim 16, wherein said bridge ASIC has a PPM interface coupled to said docking connector which PPM interface is configurable to provide alternative voltage signaling across said interface depending upon the requirements of said docking station to which said PPM is docked.

18. The computer system module in claim 17, wherein said alternative voltage signaling includes providing either 5 volt or 3.3 volt signaling depending upon the requirements of said docking station to which said PPM is docked; and wherein said bridge ASIC providing automatic conversion from 5 volt to 3.3 volt signals and from 3.3 volt to 5 volt signals as required to maintain compatibility.

19. The computer system module in claim 17, wherein said interface is automatically configured to provide compatible signal voltages in response to an identification information communicated to said bridge ASIC from either of said PMM or said docking station.

20. The computer system module in claim 1, wherein said bridge device comprises:
   a bridge application specific integrated circuit (ASIC), said bridge ASIC being operative to control the impedances of said bus lines, and to increase the number of connectable devices to said bus without violation of said bus device loading specifications.

21. The computer system module in claim 1, wherein said cooling means comprises conductive cooling means for conducting heat generated by components within said case to the surface of said case, and power management means to reduce the heat generated by electrical components within said case to predetermined limits.

22. The computer system module in claim 1, wherein said cooling means comprises a liquid heatsink disposed adjacent said PCB and between said PCB and an internal surface of one of said walls of said case.

23. The computer system module in claim 22, wherein said cooling means further comprises a thermally conductive case material for transferring heat generated proximate said PCB from said liquid heatsink material to the external surface of said case.

24. The computer system module in claim 23, wherein said cooling means comprises power management means for reducing the heat generated within said case in response to predetermined control signals.

25. The computer system module in claim 24, wherein said power management means comprises means for reducing a processor system clock rate so that power consumption and heat generation by said processor and related logic are reduced.

26. The computer system module of claim 25, wherein said power management means further includes a stop clock system management mode (SMM) means coupled to an oscillator, wherein said oscillator in combination with said SMM provides timing signals to said processor to control the processing execution speed of said processor and thereby controls the heat generated by said processor.

27. The computer system module of claim 1, wherein said case is completely sealed to eliminate air flow into or out of said case so that said components are not adversely affected by atmospheric contaminants and if fabricated from a material having a high thermal conductivity so that heat generated within said case is efficiently conducted to said case material.

28. The computer system module of claim 1, wherein said PPM further comprises a second bridge device coupled between a processor main bus and said PCI bus,
   said first and said second bridge devices acting to decouple said processor main bus from said docking stations by two configurable bridge devices so that said processor and components of said PPM may be upgraded by modifying said bridge devices without affecting other architecture within said PPM.

29. The computer system module of claim 28, wherein said bridge ASIC couples to said docking station PCI bus portion, to said PPM PCI bus portion, and to an ATA (IBM at attachment) bus; and wherein said ATA bus coupled to said bridge ASIC electrically connects said bridge ASIC to said mass storage device.

30. A high performance, transportable computer system, comprising:
   a personal processor module (PPM); and
   a docking station an input device, an output device, a power supply for powering said PPM, and a dock for docking said personal processor module located within said docking station;
   said personal processor module being enclosed by a case which fits within said dock and further including:
     a docking connector securely attached to said case for electrically connecting said personal processor module to said dock and said docking station;
     at least one printed circuit board (PCB) which fits within said case and is electrically connected to said docking connector and has components of said PPM attached to and electrically connected to said PCB, said components including a processor and related logic including a memory, wherein electrical signals between said PPM and said docking station are communicated to said components of said PPM;
     a mass storage device, electrically connected to said at least one printed circuit board and located within said case;
     first cooling means located within said case adjacent said at least one printed circuit board and also adjacent to one of said walls of said case for transferring heat away from said components of said personal processor module to said case; and
     wherein said components of said personal processor module include bridge means for coupling and isolating electrical buses of said personal processor module to and from each other whereby said personal processor module is easily upgradeable;
     said processor, said related logic, and said mass storage device being powered by said power supply of said docking station and exchanging data with said docking station via said docking connector.

31. The computer system of claim 30, wherein said bridge means for coupling and isolating includes means for coupling a peripheral component interface bus in said PPM to a peripheral component interface bus within said docking station via said docking connector,
   said bridge means providing PPM bus to docking station bus communication and bus signal conditioning including bus signal isolation and bus signal voltage conversion, and
   said bridge means is adaptable so that said communication and said bus signal conditioning may be altered in response to modifications to said PPM components so that said PPM is easily upgradeable and retains compatibility with unmodified ones of said docking stations.

32. A method for modularizing an electrical device including a plurality of electrical components on at least one printed circuit board wherein at least one of said components generates heat and for removing said heat from said modularized electrical device, said method comprising the steps of:
   providing a thermally conductive case;
   mounting said at least one printed circuit board having ones of said electrical components with relatively high thermal emissivity adjacent an internal surface of said case;
   mounting a liquid heatsink between said thermally emissive electronic components and said internal surface and in contact with each;
   sealing said case to prevent atmospheric contaminants from entering said case;
   controlling an activity of at least one of said plurality of electrical components to maintain operation of said modularized electrical device within a predetermined reasonable temperature range.

33. A computer system module for use with any one of a plurality of docking stations, each said docking station providing necessary computer system components not provided by said module so that only when said module and said docking station are coupled together does the combination form an operational computer system; said necessary computer system components provided by said docking station comprising a power supply, a computer system input device, and a computer system output device; said docking station further comprising a docking station connector for electrically connecting said docking station to said module, said module comprising:

- a sealed case formed in the shape of a box from a thermally conductive material;
- a microprocessor mounted to a printed circuit board internal to said case;
- thermal conduction means in contact with and extending between said microprocessor and an interior surface of said case for conducting heat generated by said microprocessor to said case material;
- a random access memory electrically coupled to said microprocessor mounted internal to said case;
- a disk drive mass storage device disposed internal to said case and electrically coupled to said printed circuit board and to said microprocessor;
- at least one logic circuit disposed internal to said case and operating in conjunction with said microprocessor, said memory, and said disc drive; and
- an electrical connector extending between an interior portion of said case and an exterior portion of said case and communicating electrical signals between said printed circuit board interior to said case and said docking connector exterior to said case;
- said microprocessor mounted directly adjacent to a top wall of said case when said case is in operational orientation so that convection of heat generated by said microprocessor to other portions of said case are minimized and in contact with said thermal conduction means so that conduction of said heat to said case is maximized.

34. The computer system module in claim 33, wherein said at least one logic circuit has a relatively lower heat generation than said microprocessor and is disposed adjacent one of said case bottom wall or side wall surfaces, and wherein said disk drive is disposed interior to said top wall mounted printed circuit board and said side wall mounted logic circuit.

35. The computer system module in claim 34, wherein said module further comprises second thermal conduction means in contact with and extending between said logic circuit and said interior side wall surface of said case for conducting heat generated by said logic circuit to said case material.

36. The computer system module in claim 33, wherein said thermal conduction means comprises a liquid heatsink.

* * * * *